June 24, 1941.  E. MARTIN ET AL  2,246,745
PROPELLER PITCH CONTROL VALVE
Filed May 18, 1939
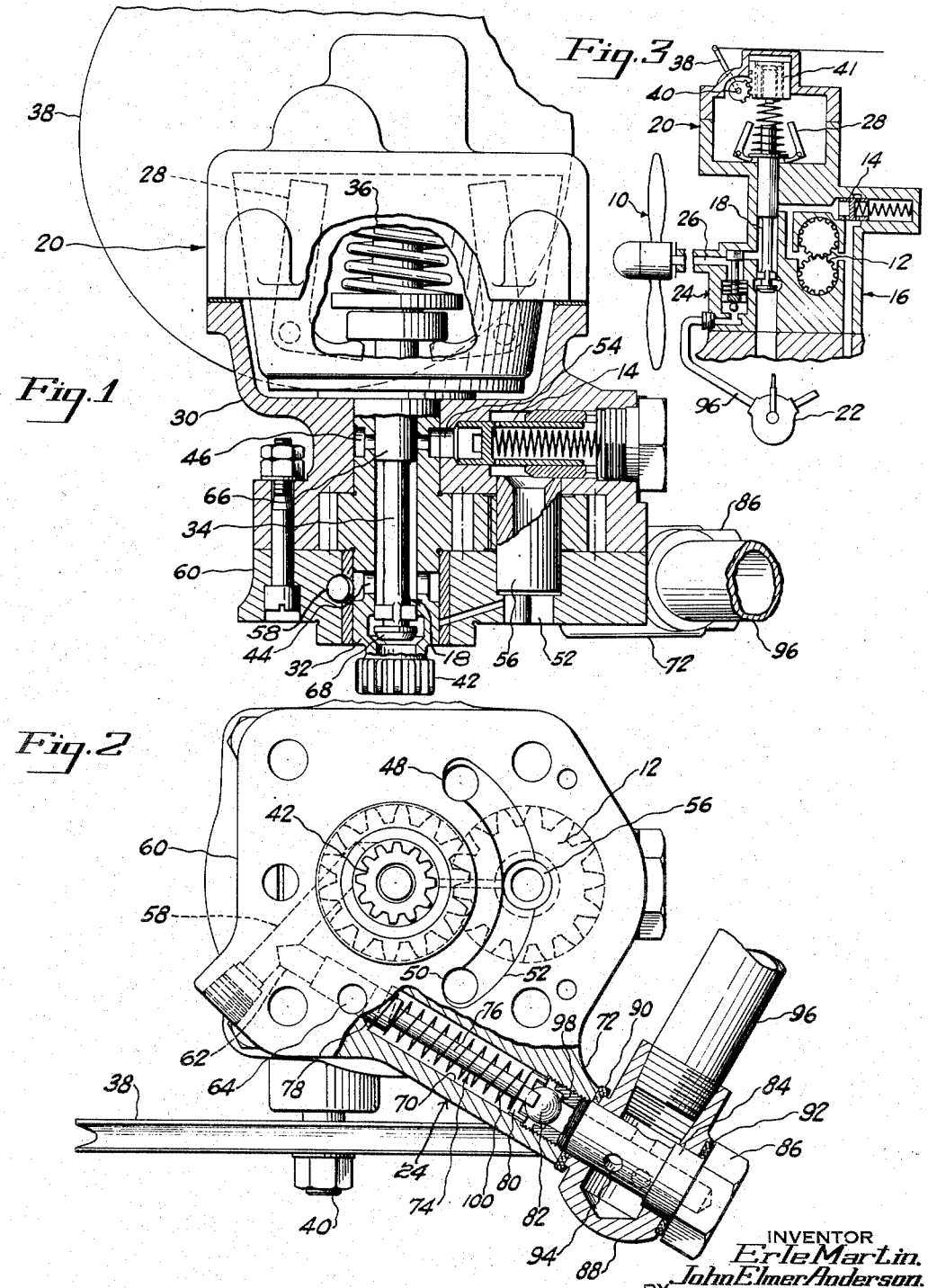
INVENTOR
Erle Martin.
John Elmer Anderson.
BY Harris G. Luther
ATTORNEY Patented June 24, 1941

2,246,745

UNITED STATES PATENT OFFICE 2,246,745

PROPELLER PITCH CONTROL VALVE

Erle Martin, West Hartford, and John Elmer Anderson, Portland, Conn., assignors to United Aircraft Corporation, East Hartford, Conn., a corporation of Delaware Application May 18, 1939, Serial No. 274,384

11 Claims. (Cl. 264—3)

This invention relates to improvements in control devices for controllable pitch propellers and has for an object the provision of an improved pressure actuated valve for controlling the application of hydraulic fluid under pressure to a hydro-controllable propeller.

A further object resides in the provision of a pressure actuated valve incorporated in a constant-speed control device for regulating the pitch of a controllable-pitch propeller.

A somewhat more specific object resides in the incorporation in a constant-speed control device for a hydro-controllable propeller of an improved valve operable by a pressure higher than the working pressure of said constant-speed device and operative to cut-off said constant-speed device from the propeller and connect the propeller directly with the source of said higher pressure.

Other objects and advantages will be more particularly pointed out hereinafter or will become apparent as the description proceeds.

In the accompanying drawing, in which like reference numerals are used to designate similar parts throughout, there is illustrated one form of pressure actuated valve constructed and arranged according to the invention. The drawing, however, is for the purpose of illustration only and is not to be taken as in any way limiting or restricting the scope of the invention.

In the drawing, Fig. 1 is a vertical sectional view through a constant-speed control device, such as a centrifugal governor, showing the application thereto of a pressure actuated valve constructed according to the invention.

Fig. 2 is a bottom plan view of the governor and valve shown in Fig. 1, the pressure actuated valve being broken away and shown in section to better illustrate the construction thereof, and Fig. 3 is a schematic illustration of a governor, propeller and pressure actuated valve showing the operative relationship between these various parts.

Referring to the drawing in detail and particularly to Fig. 3, the numeral 10 generally indicates a hydro-controllable propeller of the type particularly shown and described in United States Patent Number 2,174,717 issued October 3, 1939, to Frank W. Caldwell, Erle Martin and John E. Anderson for Multiposition controllable pitch propeller. Such a propeller has a normal operative range for maintaining the engine speed substantially constant within which range the propeller pitch changing mechanism is subjected to hydraulic fluid under a predetermined pressure established by the pump 12 and relief valve 14 of the hydraulic servo mechanism, generally indicated at 16, under the control of the valve 18 operated by the speed responsive governor, generally indicated at 20.

While the propeller is responsive, under the application thereto of hydraulic fluid at the pressure established by the pump 12 and relief valve 14 as regulated by the governor actuated valve 18, to maintain the speed of the propeller driving engine constant at a predetermined rate, the propeller pitch may be moved beyond the constant-speed range to feathered condition by applying to the pitch changing mechanism hydraulic fluid at a pressure substantially higher than that for which the valve 14 is set and may be returned from the feathered condition to the normal or constant-speed range by applying to the pitch changing mechanism a still higher pressure, all as particularly illustrated and described in United States Patent Number 2,174,717, referred to above. The hydraulic fluid at the feathering and unfeathering pressures may conveniently be obtained from a separate source, such as the hand or motor operated high pressure pump schematically illustrated in Fig. 3 and generally indicated by the numeral 22. As is also shown in Fig. 3, applicants' improved pressure actuated valve, generally indicated at 24 acts, when subjected to high pressure from the high pressure pump 22, to block the fluid connection between the propeller and the governor valve 18 and connect the propeller feed line 26 directly with the outlet of the high pressure pump 22 so that the hydraulic fluid under high pressure from the pump 22 cannot flow back through the servo mechanism 16 and thereby dissipate its pressure.

The governor 20 may be an adjustable centrifugal governor of the type particularly illustrated and described in United States Patent Number 2,204,640, issued June 18, 1940, to Elmer E. Woodward for Governor mechanism. Such a governor may have a plurality of flyweights 28 rotatably mounted in a casing 30 upon a rotatable hollow drive shaft 32 and arranged to act upon a valve stem 34 against a force exerted in the opposite direction by a governor speeder spring 36. The speeder spring may be adjustable by suitable means, particularly illustrated and described in the United States Patent Number 2,204,640, referred to above, to change the speed setting of the governor, such means including the manually rotatable pulley 38 mounted upon the shaft 40 operatively connected with a movable abutment 41 bearing against one end of the spring 36. The hollow drive shaft 32 is provided at its lower end with a drive spline 42 which is disposed within the propeller driving engine and drivingly connected to a moving part of the engine and is also provided with spaced ported passages 44 and 46 with which the valve stem 34 cooperates to control the flow of hydraulic fluid to and from the propeller.

Hydraulic fluid, such as engine lubricating oil, may be delivered to the pump 12 by the engine lubricating oil pump through either one of the apertures 48 or 50 the alternative one being plugged, depending upon the direction of rotation of the pump, and the connecting channel 52. This hydraulic fluid at the constant-speed operating pressure is delivered by the pump 12 to the pressure chamber 54 which is connected at one end with the ported passage 46 and closed at the other end by the relief valve 14. If the pressure in the chamber 54 exceeds that for which the valve 14 is set the valve 14 will be moved and some of the fluid may then flow from the pressure chamber through the hollow pump shaft 56 back to the intake channel 52 to be recirculated through the pump.

A channel 58 leads through the governor base 60 from the ported passage 44 to a connecting channel 62 which communicates through an aperture 64 in the governor base and a channel, not illustrated, in the forward portion of the propeller driving engine, with the propeller feed line 26. The valve stem 34 is provided with a piston 66 controlling the ported passage 46 and at the other end of a reduced portion with a piston 68 controlling the passage from the ported passage 44 through the hollow drive gear 42 and adjacent portions of the shaft 32 to the engine oil sump. With this arrangement it is apparent that when the valve stem 34 is in its lowermost position, as illustrated in Fig. 1, hydraulic fluid from the propeller may drain through the passage 44, the hollow shaft 32 to the oil sump and that, when the stem is moved to its uppermost position by the centrifugal action of the flyweight 28, oil from the pressure chamber 54 will flow through the passage 46 to the space surrounding the reduced portion of the valve stem between the two pistons 66 and 68, and from this space through the passage 44 and the channels 58 and 62 to the propeller feed line, the passage from the ported passage 44 to the sump being closed by the piston 68. Thus during constant-speed operation hydraulic fluid will be forced into or drained from the propeller pitch changing mechanism in response to the requirements of the speed responsive governor 20 to maintain the engine speed constant at a rate determined by the setting of the movable abutment 41.

The channel 62 in the governor base leads into a cylindrical chamber 70 provided in an extension 72 formed on one side of the governor base. Within this cylindrical chamber 70 there is disposed a valve member 74 comprising a shaft 76 having at one end adjacent to the aperture 64 a valve piston 78 movable in a reduced portion of the chamber 70 and at its other end a cage 80 for the valve ball 82. A hollow stem 84 having a closed hexagonal end portion 86 is passed through the pipe terminal fitting 88 and screw threaded into the end of the cylindrical chamber 70 in a manner to clamp the fitting 88 against the end of the extension 72 and provide a fluid tight connection by compression of the gaskets 90 and 92.

The hollow stem 84 is provided within the fitting 88 with apertures 94 through which hydraulic fluid may flow from the end of the pipe 96 to the interior of the stem and from thence into the chamber 70. At its open end the stem 84 is provided with a valve seat 98 with which the ball 82 cooperates to close the passage from the channel 62 into the hollow stem 84 whenever the pressure of hydraulic fluid in the hollow stem does not exceed the pressure of the fluid in the channel 62 by a predetermined amount, the ball being urged into position against the seat 98 by the compression spring 100 which surrounds the shaft 76 of the valve 74.

When the high pressure pump 22 is operated to feather or unfeather the propeller 10, the fluid under high pressure flowing through the tube 96, the fitting 88 and stem 84 unseats the valve ball 82 and flows into the chamber 70. The high pressure fluid in the chamber 70 acts on the piston 78 to compress the spring 100 and move the valve to the position schematically shown in Fig. 3 in which it blocks the passage 62 beyond the aperture 64 which leads from the reduced portion of the chamber, and prevents a flow of fluid from the chamber 70 into the channel 58 at the same time connecting the aperture 64 with the chamber 70 so that the high pressure fluid may flow directly to the propeller.

In the use of a hydraulic control of the character indicated for controlling a hydro-controllable aeronautical propeller, there is no pressure in the oil line leading from the governor valve when the propeller is feathered since the engine is then stopped and the engine oil supply discontinued. Also there may be no pressure in this line when it is desired to feather the propeller if the feathering is done because of engine failure. Under these circumstances applicants' improved pilot valve has a particular advantage in that once the external oil line is opened and the oil pressure from the external high pressure source acts against the piston 78 the valve will stay in position to connect the external source with the propeller without any pressure drop through the valve. The only pressure drop incident to the operation of the valve is that incident to initial opening of the check valve 82 and this continues only until the pressure in the valve chamber acting on the piston 78 becomes sufficient to overcome the force of the spring 100. Obviously there is no pressure drop through the valve between the governor line and the propeller since under this condition the spring 100 maintains the valve plunger in proper position. Incorporating the valve 24 in the base of the governor or governor servo mechanism 16 provides a light, simple and efficient construction avoiding the use of external fluid connections between the valve and the governor thereby reducing the weight of the entire organization and the possibility of breakage or leakage. In the arrangement shown the governor base itself provides a bearing for the end of the rotatable shaft 32, a reversible intake for the pump 12, the oil passages from the governor valve and from the pressure actuated valve to the engine included channel connecting with the propeller feed line and the casing of the pressure actuated valve, and a support for the fixed pump shaft thereby combining a number of elements into one small and relatively simple part.

While a particular mechanical embodiment has been illustrated in the accompanying drawing and hereinabove described for the purpose of disclosing the invention, it is to be understood that the invention is not limited to the particular construction and arrangement so illustrated and described, but that such changes in the size, shape and arrangement of parts may be resorted to as come within the scope of the sub-joined claims.

Having now described the invention so that others skilled in the art may clearly understand the same, what it is desired to secure by Letters Patent is as follows:

I claim:

1. A governor base for a governor and hydraulic speed control having a fluid passage therein leading from said control to an aperture opening to the exterior of said base and a valve casing integral therewith, and valve mechanism in said casing responsive to the pressure of fluid from a source external to said base to control said fluid passage.

2. A base structure for a speed governor and hydraulic speed control servo mechanism including a fluid pressure pump, said base structure providing a support for the shafts of said pump and having therein a passage for hydraulic fluid from said pump to an aperture leading to the exterior thereof, and integrally incorporating a hollow valve casing including a valve mechanism actuated by fluid pressure higher than the pressure of the fluid delivered by said pump to block the fluid passage between said pump and said aperture.

3. In combination with a speed governor, a hydraulic servo mechanism including a fluid pump, a governor operated valve between said servo mechanism and a speed regulating device under control of said governor, and a source of hydraulic fluid under pressure external to said servo mechanism, a base structure including a fluid passage from said valve to an aperture adapted to communicate with a channel leading to said speed regulating device, a hollow valve casing communicating at one end with said passage, means connecting said external pressure source with the opposite end of said casing, and a valve in said casing operative when subjected to fluid pressure from said external source to block the fluid passage in said base between said aperture and said governor operated valve and simultaneously connect said external source directly with said aperture.

4. In combination with a speed governor, a hydraulic servo mechanism including a fluid pump, a governor operated valve between said servo mechanism and a speed regulating device under control of said governor, and a source of hydraulic fluid under pressure external to said servo mechanism, a base structure including a fluid passage from said valve to an aperture adapted to communicate with a channel leading to said speed regulating device, a hollow valve casing communicating at one end with said passage, means connecting said external pressure source with the opposite end of said casing, and a valve in said casing and a check valve in said casing operative when the pressure from said external source is below the pressure developed by said pump to block the connection between said external source and said valve.

5. In combination with a speed governor, a hydraulic servo mechanism including a fluid pump, a governor operated valve between said servo mechanism and a speed regulating device under control of said governor, and a source of hydraulic fluid under pressure external to said servo mechanism, a base structure including a fluid passage from said valve to an aperture adapted to communicate with a channel leading to said speed regulating device, a hollow valve casing communicating at one end with said passage, means connecting said external pressure source with the opposite end of said casing, and a valve in said casing comprising a shaft having a piston at one end and a ball cage at the opposite end, and a spring acting to seat said ball against the end of said connecting means.

6. A valve comprising, an elongated hollow casing connected at its opposite ends with fluid passages and provided intermediate its length with an aperture leading from the interior to the exterior thereof, a movable plunger in said casing provided at one end with a piston having two operative positions, one at either side of said aperture, and a ball cage at the opposite end, a ball carried by said cage, a hollow stem secured in the end of said casing adjacent to said ball and provided with a seat for said ball, and a spring for urging said ball against said seat.

7. A valve comprising, an elongated hollow casing connected at its opposite ends with fluid passages and provided intermediate its length with an aperture leading from the interior to the exterior thereof, a movable plunger in said casing provided at one end with a piston having two operative positions, one at either side of said aperture, and a valve element at the opposite end of said plunger, a hollow stem secured in one end of said casing having a seat for said valve element, and a spring in said casing acting on said plunger to urge said valve element against said seat.

8. A valve comprising a casing having a cylindrical bore open at one end and provided at the opposite end with a reduced extension connected with a fluid passage, said casing having through one wall thereof intermediate the length of said extension an aperture adapted to be connected with a second fluid passage, a valve plunger in said casing having at one end a piston reciprocable in said reduced extension to positions at opposite sides of said aperture and a check valve element at the opposite end, a hollow stem secured in the open end of said bore constituting a portion of a third fluid passage and having a seat for said check valve element, and a spring in said bore acting on said plunger to urge said check valve element against said seat, whereby said valve will operate to connect said first mentioned or said third fluid passage directly with said aperture and said second fluid passage and simultaneously block the alternative one of said first mentioned or third fluid passages according to the predominating pressure in said first mentioned or third fluid passages.

9. In combination with a governor base having therein a fluid passage, a valve receiving bore communicating at one end with said passage and open at the opposite end, and a fluid outlet from said valve bore, an external fluid line connected to the open end of said valve bore, a valve plunger in said valve bore operative to connect either said fluid passage or said fluid line with said fluid outlet and simultaneously block the alternative fluid line or fluid passage in accordance with a preponderance of fluid pressure in said fluid passage or said fluid line, and a spring associated with said plunger and operative to maintain said fluid passage connected with said outlet and said fluid line blocked until the pressure in said fluid line exceeds the pressure in said fluid passage by a predetermined amount.

10. In combination with a valve casing having a valve receiving bore, a fluid inlet passage at each end of said bore and a fluid outlet intermediate the length of said bore, a valve plunger reciprocable in said bore having at one end a piston for controlling the connection between said outlet and alternative fluid passages and at the other end a check valve element for blocking one of said passages to prevent leakage of hydraulic fluid past said piston from one passage to the other, and a spring associated with said plunger for urging said plunger into position to block said one passage.

11. In combination with a valve casing having a valve receiving bore, a fluid inlet passage at each end of said bore and a fluid outlet intermediate the length of said bore, a valve plunger reciprocable in said bore having at one end a piston for controlling the connection between said outlet and alternative fluid passages and at the other end a check valve element for blocking one of said passages to prevent leakage of hydraulic fluid past said piston from one passage to the other, and a spring associated with said plunger for urging said plunger into position to block said one passage, said piston and said fluid outlet being so constructed and arranged that when there is no fluid pressure in one of said passages the alternative passage is maintained in communication with said outlet with no drop in fluid pressure through said valve.

ERLE MARTIN.
JOHN ELMER ANDERSON.